Oct. 13, 1953 A. DAVISON ET AL 2,655,560
CIRCUIT ARRANGEMENT, INCLUDING LOW-FREQUENCY RELAXATION OSCILLATORS
Filed Sept. 12, 1951 2 Sheets-Sheet 1
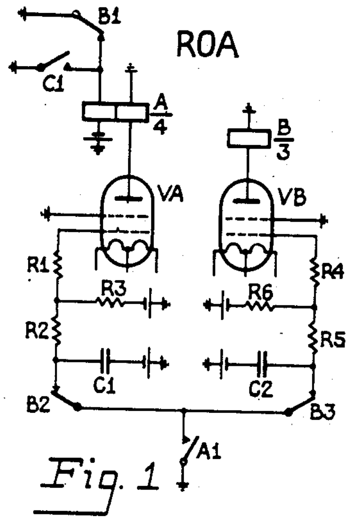
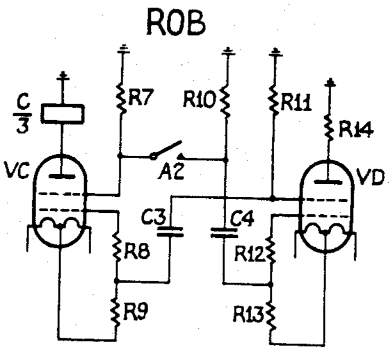
Fig. 2
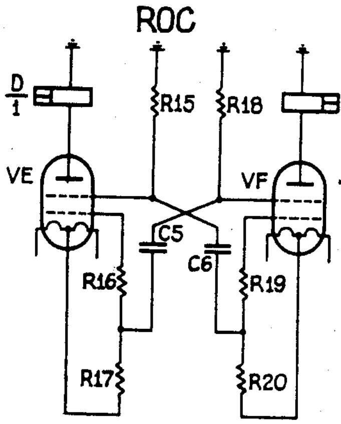
Fig. 3
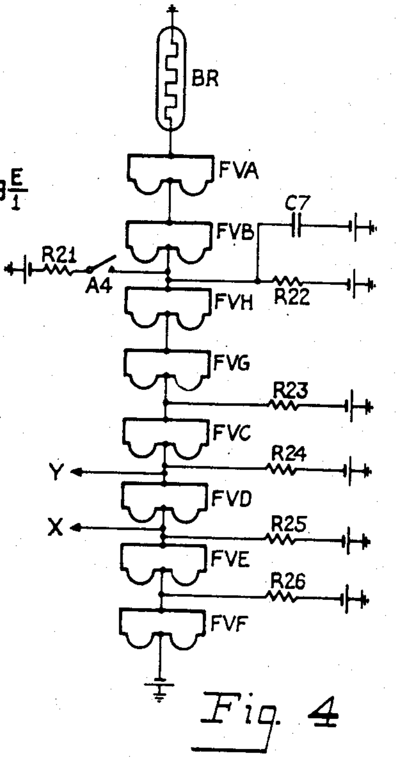
Fig. 4
INVENTOR.
ALAN DAVISON AND
LESLIE JOHN ALLEN
BY Lippincott + Smith
ATTORNEYS Oct. 13, 1953 A. DAVISON ET AL 2,655,560

CIRCUIT ARRANGEMENT, INCLUDING LOW-FREQUENCY RELAXATION OSCILLATORS

Filed Sept. 12, 1951 2 Sheets-Sheet 2

INVENTOR.
ALAN DAVISON AND
LESLIE JOHN ALLEN
BY Lippincott & Smith
ATTORNEYS

Patented Oct. 13, 1953

2,655,560

UNITED STATES PATENT OFFICE 2,655,560

CIRCUIT ARRANGEMENT INCLUDING LOW-FREQUENCY RELAXATION OSCILLATORS

Alan Davison and Leslie John Allen, Liverpool, England, assignors to Automatic Telephone & Electric Company Limited, Liverpool, England, a British company Application September 12, 1951, Serial No. 246,312
In Great Britain October 12, 1950

10 Claims. (Cl. 179—84)

The present invention relates to relaxation oscillators and is more particularly concerned with the stabilisation of low frequency oscillators of this type against transient changes in the supply voltage. The invention has particular application to the generation of signals as used in telephone systems, but it will be understood that it is not limited to such use.

By the term "relaxation oscillator" is meant a generator of oscillations characterised by cycles, each consisting of a period during which energy is stored in a reactive element follower by a period of transition or relaxation during which the reactance discharges. A form of relaxation oscillator often used for obtaining low frequency oscillations is the multivibrator.

Multivibrators are susceptible to variations of supply voltage because of the exponential rate of discharge in their resistance/capacity timing circuit. During a considerable portion of the discharge period the capacitive element carries a comparatively small charge, so that a sudden slight change in voltage in this state would be sufficient to trigger the circuit prematurely. Multivibrators with a low frequency of oscillation are particularly susceptible in that a greater number of oscillations are likely to be affected than in high frequency multivibrators.

Voltage surges in a power supply are experienced when a number of pieces of intermittently operated apparatus are fed from the same supply, and the effect is often increased when the voltage source has a small current capacity. This is frequently the case, for instance, in small telephone exchanges such as P. A. X's, R. A. X's and the like where the power supply may be a small high-resistance battery, an eliminator or a generator. The expense involved precludes the use of an elaborate smoothing circuit for the eliminator or of a generator with good regulation, so that surges of several volts may occur as switches are taken into use or released.

It is the chief object of the invention to provide a low frequency relaxation oscillator which is substantially immune from sudden surges in the supply voltage. A further object of the invention is to provide an improved ringing current and tone generator.

According to a feature of the invention, in a circuit arrangement including a low frequency relaxation oscillator having two interacting portions each including a thermionic tube and a timing circuit comprising resistive and capacitive elements, the current source for said timing circuits is adapted to have one terminal disconnected from the timing circuits when the capacitive element thereof is charged.

According to another feature of the invention, in a circuit arrangement including a low frequency relaxation oscillator having two interacting portions each including a thermionic tube and a timing circuit comprising resistive and capacitive elements, the anode circuit of each tube includes an electromagnetic relay one of which relays is operated when both tubes are non-conducting and serves to complete a charging circuit for the capacitive elements of the timing circuits while the tubes are rendered conducting on the charging of said elements whereupon said second relay is operated to disconnect the charging circuit, the time during which the tubes remain conducting being determined by the timing circuits.

According to a further feature of the invention, in an electronic ringing current and tone generator for use in telephone systems, a constant frequency oscillation generator has two output circuits one of which provides a continuous number-unobtainable tone and also a tone which is interrupted under the control of a relaxation oscillator to give busy tone while the second output of said generator is modulated by a second relaxation oscillator controlled by said first relaxation oscillator and is interrupted under the control of a third relaxation oscillator to provide ring tone.

The invention will be better understood from the following description of one embodiment which is given by way of example and which illustrates its application to a generator for ringing current and tones, suitable for use in small automatic telephone exchanges such as P. A. X's and R. A. X's. The description should be read in conjunction with the accompanying drawings, of which:

Figs. 1–3 show the circuits of three relaxation oscillators,

Fig. 4 shows the connections of the filaments of the thermionic tubes, and

Figure 5:
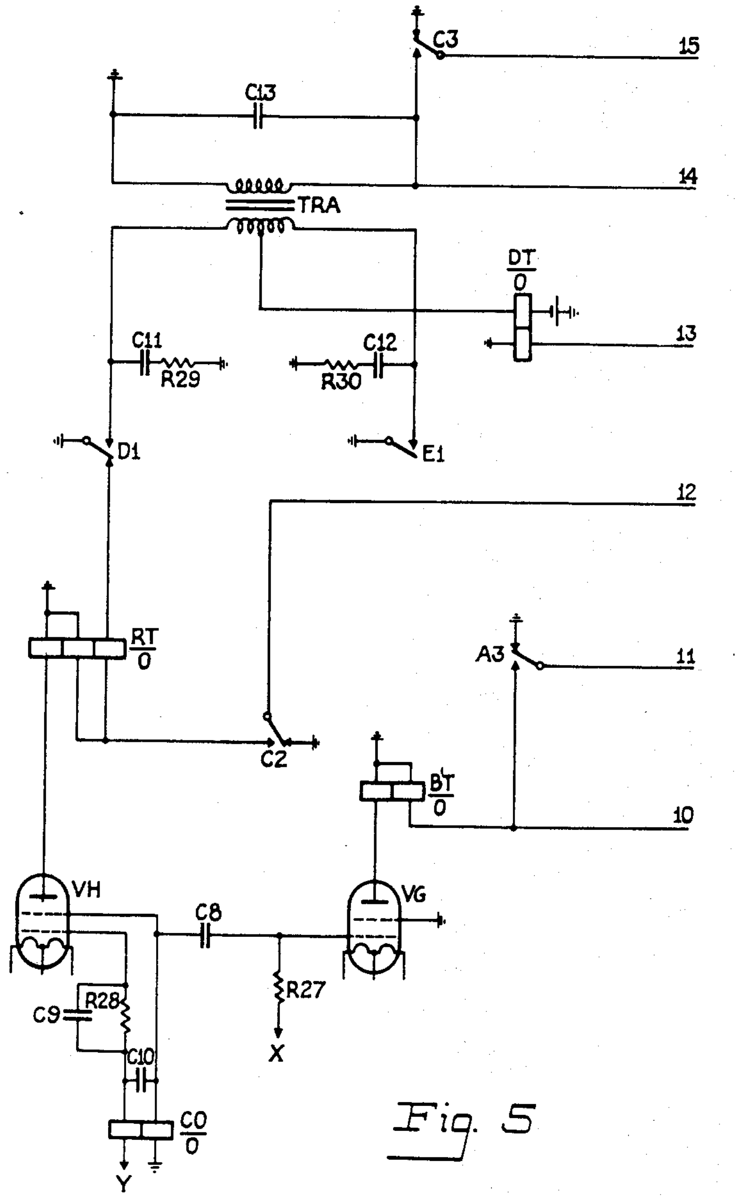
Fig. 5 shows the arrangements for deriving ringing current and tones from the interaction of the three relaxation oscillators and the oscillator which is included in this figure.

The circuit to be described is arranged to operate from the customary 50 volt supply of the telephone exchange, the current source being a battery, eliminator or generator. The positive pole of the current source is at earth potential and is indicated as such in the drawings.

Referring now to Fig. 1, the relaxation oscillator ROA comprises two thermionic tubes VA and VB, which may conveniently be of the four electrode type. The tube VA has the right-hand winding of the double-wound relay A connected in its anode circuit, and a relay B is connected in the anode circuit of the tube VB. The control grid of the tube VA is connected to the negative pole of the battery or other current source via the resistors R1 and R3. The resistor R3 together with resistor R2 and capacitor C1 forms a timing network, capacitor C1 being connected to the negative pole. Similarly for the tube VB, the control grid is connected to the negative pole by resistors R4 and R6, while resistors R5 and R6 together with capacitor C2 constitute the timing circuit.

The values of the components in the timing circuits are so chosen that this relaxation oscillator is asymmetric in operation, the tube VA conducting for one second and non-conducting for the succeeding two seconds. The operation is as follows:

Upon the connection of the power supply, relay A operates on its left-hand winding over contacts B1. At contacts A1 a charging circuit is thereby completed for capacitors C1 and C2 which charge substantially to the supply voltage. The sudden application of a positive potential to their grids causes both tubes VA and VB to conduct, positive potential being permanently connected to their screen grids. Relay B now operates, disconnecting the charging circuits of capacitors C1 and C2 from the positive pole of the supply, though relay A remains held over its right-hand winding due to the anode current of tube VA.

The values of the components R2, R3 and C1 are such that the capacitor C1 discharges after one second to a voltage which causes the grid potential to fall relative to the cathode potential to a value corresponding to the cut-off voltage for the tube. This is achieved by maintaining the cathode at a potential positive with respect to the negative pole of the supply, the circuit details for which will be examined later.

After one second has elapsed, tube VA will cease to conduct and relay A will therefore release. The timing circuit associated with the tube VB, comprising the elements R5, R6 and C2, is arranged so that this tube is cut off after three seconds. After this period, relay B will release and close a circuit for relay A at contacts B1. Relay A will then operate and the cycle will repeat. The operate and release time of the relays is small compared with the three second period of the cycle, so that during the three seconds, tube VB conducts substantially all the time and tube VA conducts for one second.

It will be seen that the timing circuits for the relaxation oscillator ROA do not include the current source, so that assuming the capacitors C1 and C2 to be charged to the nominal voltage of the battery each time, the periodicity of the oscillator is independent of random variations in the supply voltage. There is a short interval from the instant contacts A1 close to the instant contacts B2 and B3 open (effectively the operate time of relay B) during which fluctuations of the supply voltage could affect the charge on capacitors C1 and C2. A difference in charge of a few volts at this stage will, however, not seriously affect the discharge time, and the oscillator can be regarded therefore as being substantially immune from transients in the supply.

Referring now to Fig. 2, the relaxation oscillator ROB is of the multivibrator type and includes the two tubes VC and VD which each have at least four electrodes, and is also asymmetric in operation, the tube VC conducting for 0.4 second and the tube VD for 0.2 second, when the multivibrator is running freely. A relay C is connected in the anode circuit of tube VC, and the operation of the multivibrator is controlled by the contact A2 of relay A.

When relay A is released and its contact A2 is in the normal position as shown in the drawing, the tube VD is taking its normal current while tube VC is taking insufficient current to operate relay C due to the high resistance of resistor R7 connecting its screen to the positive pole of the supply. On the operation of relay A, resistor R10, which has a much smaller resistance than R7, is connected in parallel with the latter thus increasing the screen potential of tube VC. This allows more current to flow in tube VC, and the consequent voltage drop caused in resistor R10 drives the grid of tube VD negative with respect to cathode via capacitor C4 and resistor R12. The resultant drop in screen current in tube VD reduces the potential drop in resistor R11 and a positive-going pulse is transmitted to the grid of tube VC via capacitor C3 and resistor R8, and the current in tube VC is thereby further increased. The effect is cumulative, and current in tube VC builds up to its maximum value almost instantaneously, so that upon the operation of relay A, relay C operates and tube VD is cut off substantially immediately.

The timing circuit for tube VC comprising resistors R9 and R11 and capacitor C3, and the timing circuit for tube VD comprising resistors R13, R7 and R10 and capacitor C4, are arranged to give the multivibrator the periodicity stated above, i. e. 0.4 second/0.2 second. Since tube VA is arranged to conduct for one second, tube VC will conduct twice during this period and at the end of the period both tubes should be cut off. If relay A were to be released before the end of the one second period the timing of the multivibrator ROB would be upset, and in view of other considerations which will appear later, it is desirable that relay C should operate twice during the operated period of relay A and that the release of relay A should coincide with the release of relay C. To ensure this, a contact C1 of relay C is arranged to complete a circuit for relay A over its left-hand winding whenever relay C is operated. In practice it is found convenient to adjust the component values so that tube VA stops conducting after rather less than one second, and relay A is held for the remainder of the period by current through its left-hand winding over contacts C1.

The relaxation oscillator ROC of Fig. 3 is a multivibrator symmetrical in operation and functions in the well known manner. Its frequency is 16⅔ cycles per second. The high-speed relays D and E in the anode circuits of tubes VE and VF operate and release once in every cycle, the release of one relay coinciding with the operation of the other.

It has been found desirable to employ thermionic tubes with directly heated low voltage cathodes, and the circuit for these is shown in Fig. 4. The filaments shown are designated similarly to their corresponding tubes, filament FVA being the cathode of tube VA etc. The filaments all have centre connections and the two portions are connected in parallel, the filaments being series connected as shown in the drawings. In the case of a 50 volt supply a suitable type of tube would be that requiring about 1.4 volts for the heater when its two halves are connected in parallel. The total voltage drop across the series connected filaments would in this case be about 12 volts, the remaining voltage drop being taken up by a ballast resistor BR connected in series with the filaments. The voltage across the ballast resistor would be about 38 volts, this being available as H. T. supply.

When a stable state of current flow exists in the circuit, the anode current in those tubes whose filaments are connected nearest the positive pole will flow through the filaments connected nearer the negative pole. Thus the current flowing in filament FVF might include the anode current of six tubes apart from the normal heating current. To avoid this overloading, resistors R22—R26 are connected in parallel with the filaments as shown in the drawing, their function being to carry the anode current while the filaments carry heating current only. An additional parallel resistance R21, arranged to be connected by contacts A4 when relay A is operated, is inserted to carry some of the anode current of tubes VA and VB. This is necessary because, unlike the multivibrators ROB and ROC the two tubes of ROA do not conduct alternately, but for one second in three both tubes are taking current. The capacitor C7 assists in reducing the surge of current through the remaining filaments when tubes VA and VB both start conducting before relay A has operated.

The generation of ringing and tones will be described with reference to Fig. 5. Two sources of ringing are required: a continuous supply alternating at 16⅔ C./S. and a similar supply interrupted to give a cycle of 0.4 second on, 0.2 second off, 0.4 second on, 2 seconds off. The tones required are: "dial" tone, "ring" tone, "number unobtainable" tone and "busy" tone.

Tube VH is again of the four electrode type and its circuit is arranged as a 400 C./S. oscillator. Resistor R28 and by-pass capacitor C9 connect the grid via the left-hand winding of the double wound coil CO to a biassing point Y. This will be seen from Fig. 4 to be at a lower potential than the cathode FVH. The right-hand winding of the coil CO is connected between the positive pole of the supply and the screen, and the coil is tuned by capacitor C10.

A 400 C./S. signal is fed from the screen of tube VH via capacitor C8 to the grid of the amplifying tube VG. The grid of this tube is connected by resistor R27 to the biassing point X in the filament circuit. The anode load is constituted by a transformer comprising the two windings of the coil BT, and the right-hand winding is connected directly to lead 10 which therefore supplies a continuous 400 C./S. N. U. tone. A second output to lead 11 via the contacts A3 provides busy tone of 400 C./S. interrupted for two seconds in every three.

Ring tone is supplied from the anode of tube VH via the centre and right-hand windings of the coil RT. The 400 C./S. current through the centre winding is modulated at 16⅔ C./S. by earth applied to the right-hand winding via contacts D1. This modulated current is interrupted at contacts C2 to provide ring tone over lead 12 at the same periodicity as interrupted ringing, i. e. 0.4 second on, 0.2 second off, 0.4 second on, 2 seconds off etc.

Transformer TRA is supplied on its primary side with earth potential alternately from contacts D1 and E1. The centre connection to this winding extends to the negative pole of the supply through the upper winding of the coil DT, and by transformer action, dial tone having a peaky wave form and a frequency of 33⅓ C./S. is fed to lead 13 from the lower winding of the coil. Contacts D1 and E1 are protected by spark quenching circuits comprising resistor R29 and capacitor C11, and resistor R30 and capacitor C12.

The secondary of transformer TRA is shunted by a smoothing capacitor C13, and supplies continuous ringing current of 16⅔ C./S. at lead 14, and interrupted ringing current via contacts C3 at lead 15.

We claim:

1. In combination, a first thermionic tube, a first responding device operative in response to anode current flow through said first tube, a second thermionic tube, a second responding device operative in response to anode current flow through said second tube, means controlled by said second responding device in its inoperative condition for operating said first responding device, first and second timing circuits comprising resistive and capacitative elements connected to a control grid of said first and second tubes respectively, means responsive to the operation of said first responding device by said second responding device in its inoperative condition for connecting a current source to the capacitative elements of said first and second timing circuits whereby said capacitative elements are charged substantially instantaneously and both said tubes conduct simultaneously and means responsive to the operation of said second responding device on the conduction of said second tube for rendering the continued operation of said first responding device dependent upon anode current flow through said first tube and for disconnecting said current source from said capacitative elements whereby said capacitative elements discharge through the resistive elements of said timing circuits to cut off said tubes and release said responding devices at times dependent upon the individual time constants of said first and second timing circuits.

2. The combination as claimed in claim 1 wherein said second responding device comprises an electromagnetic relay connected in the anode circuit of said second tube, and wherein said first responding device comprises an electromagnetic relay having two windings of which one is connected in the anode circuit of said first tube and the second is connected in a local circuit which includes a break contact of said second electromagnetic relay.

3. The combination as claimed in claim 2 and including a relaxation oscillator, means responsive to the operation of said first electromagnetic relay for triggering said relaxation oscillator, a third electromagnetic relay controlled by said relaxation oscillator and a make contact of said third relay connected in parallel with said break contact.

4. A relaxation oscillator comprising first and second thermionic tubes, first and second timing circuits comprising resistive and capacitative elements connected to a control grid of said first and second tubes respectively, means for simultaneously connecting a current source to the capacitative elements of said first and second timing circuits whereby the capacitative elements are charged substantially instantaneously and both said tubes conduct simultaneously, means responsive to the conduction of said second tube for disconnecting said current source from both said capacitative elements to enable said capacitative elements to discharge through the resistive elements of said timing circuits the time constants of which are different to enable said first tube to be cut off before said second tube and means responsive to the cut off of said second tube for reconnecting said current source to both said capacitative elements.

5. A ringing and tone generator comprising a constant frequency oscillation generator, a first asymmetric relaxation circuit, a first electromagnetic relay operated when said first relaxation circuit is in one condition of unstable equilibrium, a second asymmetric relaxation circuit having a frequency which is a multiple of the frequency of said first relaxation circuit and interconnected with said first relaxation circuit, an electromagnetic relay operated when said second relaxation circuit is in one condition of unstable equilibrium, a symmetrical multivibrator having a frequency which is greater than that of said first and second relaxation circuits and less than that of said oscillation generator, third and fourth electromagnetic relays operated when said multivibrator is in its first and second condition of unstable equilibrium respectively, a first output circuit for said constant frequency oscillation generator, said output circuit having two branches one of which is connected to deliver a continuous tone having the frequency of said oscillation generator while the second branch is interrupted by the operation of a contact of said first electromagnetic relay and a second output circuit for said constant frequency oscillation generator modulated by the operation of a contact of said third electromagnetic relay and interrupted by the operation of a contact of said second electromagnetic relay.

6. A ringing and tone generator as claimed in claim 5 including a transformer, contacts of said third and fourth electromagnetic relays arranged in operating alternately to reverse the direction of current flow over the primary winding of said transformer, the secondary winding of said transformer being connected to deliver a continuous tone having the frequency of said multivibrator and a tone interrupted by the operation of a contact of said first electromagnetic relay.

7. A ringing and tone generator as claimed in claim 6 including a second transformer having its primary winding connected to the centre point of the primary winding of said first transformer, the secondary winding of said second transformer being connected to deliver a tone having a frequency which is twice that of said multivibrator.

8. A ringing and tone generator as claimed in claim 5 wherein the tubes included in said relaxation circuits, said multivibrator circuit and said oscillation circuit have directly heated cathodes, the cathodes of the tubes being connected in series with a ballast resistor and a source of supply, means being provided to prevent overloading of said cathodes towards the negative terminal of said source of supply.

9. A ringing and tone generator as claimed in claim 8 wherein said means comprise auxiliary connections of said negative terminal over resistors to points in the series circuit.

10. A ringing current and tone generator as claimed in claim 9 wherein a second auxiliary connection is provided for the cathodes of said first relaxation circuit and means are provided for rendering said second auxiliary connection effective while both tubes in said relaxation circuit are conducting.

ALAN DAVISON.
LESLIE JOHN ALLEN.

References Cited in the file of this patent

UNITED STATES PATENTS

| Number | Name | Date |
|---|---|---|
| 2,458,283 | McCreary | Jan. 4, 1949 |
| 2,539,497 | Treadwell | Jan. 30, 1951 |
| 2,585,022 | Lewis | Feb. 12, 1952 |